United States Patent
Mizuno et al.

(10) Patent No.: US 7,160,073 B2
(45) Date of Patent: Jan. 9, 2007

(54) TAPPING SCREW

(75) Inventors: Hiromichi Mizuno, Aichi (JP); Mitsuru Kozawa, Konan (JP); Kenya Yamada, Kakamigahara (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 10/948,086

(22) Filed: Sep. 23, 2004

(65) Prior Publication Data

US 2005/0079031 A1 Apr. 14, 2005

(30) Foreign Application Priority Data

Oct. 9, 2003 (JP) ............... 2003-350450

(51) Int. Cl.
  *F16B 25/10* (2006.01)
(52) U.S. Cl. ................... 411/387.4; 411/417
(58) Field of Classification Search ............. 411/411, 411/423, 417, 387.4, 311
  See application file for complete search history.

(56) References Cited

U.S. PATENT DOCUMENTS

| | | | |
|---|---|---|---|
| 3,937,119 A * | 2/1976 | Ernst | 411/422 |
| 4,527,932 A | 7/1985 | Onasch et al. | |
| 5,061,135 A * | 10/1991 | Pritchard | 411/411 |
| 5,544,993 A * | 8/1996 | Harle | 411/411 |
| 5,704,750 A * | 1/1998 | Bartos et al. | 411/411 |
| 5,800,107 A * | 9/1998 | Giannuzzi et al. | 411/386 |
| 6,113,331 A * | 9/2000 | Grossberndt et al. | 411/411 |
| 6,152,666 A * | 11/2000 | Walther et al. | 411/311 |
| 6,322,307 B1 * | 11/2001 | Glover | 411/412 |
| 6,672,813 B1 * | 1/2004 | Kajita et al. | 411/411 |
| 6,926,484 B1 * | 8/2005 | Kram et al. | 411/311 |

FOREIGN PATENT DOCUMENTS

| | | |
|---|---|---|
| DE | 0 501 519 | 9/1992 |
| EP | 1 193 404 | 4/2002 |
| EP | 1 281 874 | 2/2003 |
| JP | 53-83958 | 7/1978 |

\* cited by examiner

*Primary Examiner*—Flemming Saether
(74) *Attorney, Agent, or Firm*—Burr & Brown

(57) ABSTRACT

A tapping screw fastened to a subject member in which a thread portion formed in a shaft portion of the tapping screw is used to form a female screw thread in a prepared hole of the subject member. An angle of a thread ridge is approximately 30 degrees, a plurality of notches are formed in a top portion of the thread portion over a predetermined range of an entire length of the shaft portion, and a joint portion for connecting the top portion and a bottom portion of the thread portion is formed to have a circular arc shape in an area having a smaller diameter than a diameter of the prepared hole of the subject matter, as viewed in a cross section including a shaft center of the tapping screw.

5 Claims, 4 Drawing Sheets

TAPPING SCREW

This application claims the benefit of Japanese Application No. 2003-350450, filed Oct. 9, 2003, the entirety of which is incorporated herein by reference.

FIELD OF THE INVENTION

The present invention relates to a tapping screw, and more particularly to a tapping screw which is fastened to a resin subject member using a threaded portion on the shaft of the screw to form a female thread in a hole formed in the subject member.

BACKGROUND OF THE INVENTION

There has been proposed a tapping screw which is fastened to a prepared hole in a subject member while cutting a female thread in the subject by screwing the threads on the tapping screw into the prepared hole in the subject. In the case of screwing the tapping screw into the subject particularly made of resin, there is a demand of making a screwing torque as small as possible, and making a torque (a strip torque) by which a female thread portion in a peripheral surface of the prepared hole of the subject is broken as large as possible. Accordingly, in order to satisfy the demand, there have been proposed tapping screws having various shapes. For example, in a tapping screw shown in Japanese Unexamined Utility Model Publication No. 53-83958, an angle of a thread ridge is set to be equal to or more than 40 degrees and equal to or less than 50 degrees, and the thread ridge is provided with a plurality of notches (grooves), thereby lowering the screwing torque and preventing the strip torque from being lowered.

However, in the prior art as mentioned above, since a top portion and a bottom portion in the thread portion of the tapping screw are connected by a linear joint portion, there has been a problem that an excess thickness in the peripheral surface of the prepared hole, which is generated by deforming the subject using the thread ridge at a time of screwing the tapping screw into the prepared hole of the subject, is hard to flow into the bottom portion of the thread portion. If the excess thickness insufficiently flows into the bottom portion of the thread portion, a fastening state between the tapping screw and the subject becomes unstable, so that there is a possibility that the female thread portion in the peripheral surface of the prepared hole is broken, even by a small torque. Further, since a magnitude of the angle of the thread ridge is not that different from the angle of the thread ridge of the general screw, it is impossible to greatly lower the screwing torque, and it is impossible to reduce a radial component of a force applied to the female thread portion in the peripheral surface of the prepared hole from a slant face of the thread ridge of the thread portion, that is, a force for expanding the subject member in a radial direction, so that there is a problem that the subject may be expanded in the radial direction and be cracked.

Accordingly, an object of the present invention is to provide a tapping screw which can solve the defects in the prior art mentioned above, can make a screwing torque into a subject member small, and does not easily break a female screw thread in a peripheral surface of a prepared hole of the subject member.

SUMMARY OF THE INVENTION

In accordance with the present invention, there is provided a tapping screw which is fastened to a subject member while forming a female screw thread in a prepared hole of the subject using a thread portion formed in a shaft portion of the tapping screw. An angle of a thread ridge in the tapping screw thread portion is approximately 30 degrees with respect to an imaginary line extending perpendicularly from a center axis of the shaft portion. A top portion of the thread portion includes partially cut notches in a predetermined range over an entire length of the shaft portion. A joint portion connects the top portion and a bottom portion of the thread portion and is formed in a circular arc shape in an area that has a smaller diameter as compared to a diameter of the prepared hole of the subject member, as viewed in a cross section including an axis of the tapping screw.

In accordance with an aspect of the present invention, the joint portion for connecting the top portion and the bottom portion in the thread portion is formed in a linear shape in an area that has a larger diameter as compared to the diameter of the prepared hole in the subject member, as viewed in the cross section. Further, in accordance with another aspect of the present invention, the top portion of the tapping screw thread portion is formed in a circular arc shape, as viewed in the cross section.

In the tapping screw in accordance with the present invention, since the angle of the thread ridge formed in the shaft portion is set to approximately 30 degrees, it is possible to make a contact area between the thread ridge and the subject small so as to lower the screwing torque, whereby it is possible to easily screw the tapping screw into the subject. Since it is possible to reduce a radial component of a force applied to the female thread portion in the peripheral surface of the prepared hole from the thread portion, that is, a force for expanding the subject in a radial direction, in accordance with making the angle of thread ridge small, it is possible to prevent the subject from being cracked. Further, since the joint portion for connecting the top portion and the bottom portion of the thread portion in the cross section including the shaft center of the tapping screw is formed in the circular arc shape in the area having the smaller diameter than the diameter of the prepared hole of the subject, it is possible to smoothly flow the excess thickness of the subject into the bottom portion of the screw at a time of screwing the tapping screw into the prepared hole of the subject, whereby it is possible to securely fasten both the members, and it is possible to increase the torque by which the female thread portion in the peripheral surface of the prepared hole is broken. Therefore, the female thread portion in the peripheral surface of the prepared hole is not easily broken. For example, in the case of fastening the tapping screw into the subject in a position in which the tapping screw is hard to be visually observed, it is possible to check out the seating of the screw on the subject only by a hand feeling, and it is possible to securely carry out a fastening work.

BRIEF DESCRIPTION OF THE DRAWINGS

FIG. 4 is a schematic view of a test apparatus for a screwing torque or the like.

DETAILED DESCRIPTION OF THE INVENTION

A description will be given below of a tapping screw according to the present invention with reference to the accompanying drawings. The tapping screw in accordance with the present embodiment is fastened to a resin subject, an illustration of which is omitted, while forming a female screw in a prepared hole of the subject, and can be preferably employed in the case of mounting a resin member to a vehicle body of a motor vehicle or the like.

Figure 1:
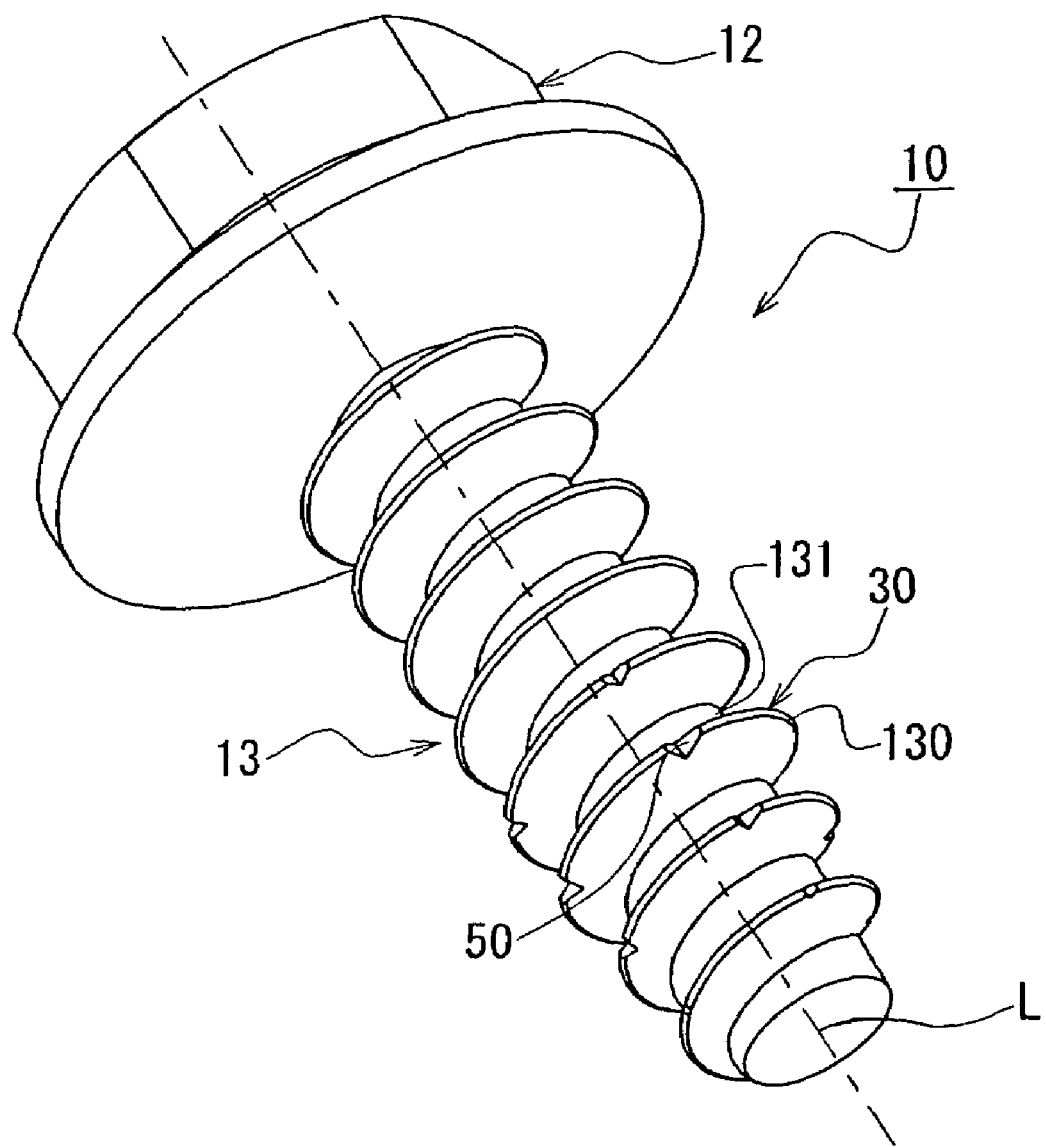
FIG. 1 is a perspective view of a tapping screw in accordance with the present invention.
Figure 2:
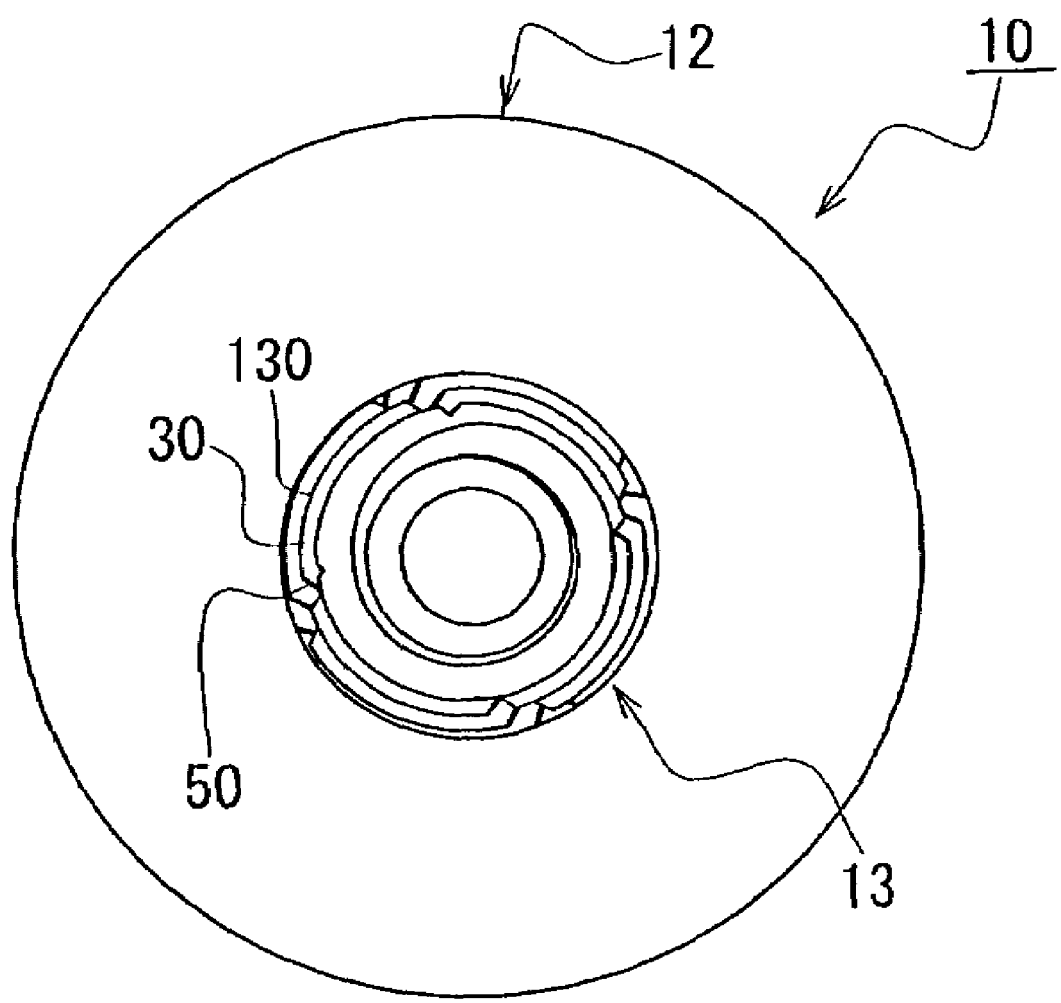
FIG. 2 is a bottom elevational view of the tapping screw in accordance with the present invention.

A description will be first given of an entire structure of a tapping screw 10 in accordance with the present invention with reference to FIGS. 1 and 2. As shown in FIG. 1, the tapping screw 10 is constituted by a head portion 12 and a shaft portion 13 which extend along a common shaft center L. The shaft portion 13 is constituted by a uniform diameter portion and a reduced diameter portion which is slightly pinched at a predetermined taper angle toward a leading end. A thread portion 30 is formed all along an approximately entire length of an outer peripheral surface of the shaft portion 13, and the thread portion 30 is formed such that an angle of a thread ridge thereof is approximately 30 degrees with respect to an imaginary line extending from the center axis of the shaft portion. In this case, approximately 30 degrees means an angle between 25 and 35 degrees, more preferably, between 27 and 33 degrees. A shape of the thread portion 30 will be discussed below.

A plurality of notches 50 are formed in a top portion 130 of the thread portion 30 from a leading end portion of the shaft portion 13 to a range corresponding to approximately four pitches in a direction of the head portion 12. As shown in FIG. 2, four notches 50 are formed with respect to one thread pitch in the top portion 130 of the approximately circular thread portion 30 such that the notches 50 are positioned equally at an interval of approximately 90 degrees with respect to a circumferential direction of the shaft portion 13, when viewing the tapping screw 10 from a side of the bottom surface. The notch 50 is formed in an approximately triangular shape in a plan view from the top portion 130 toward the bottom portion 131 (shown in FIG. 1), and is cut at such a predetermined depth so as not to reach a bottom portion 131.

Figure 3:
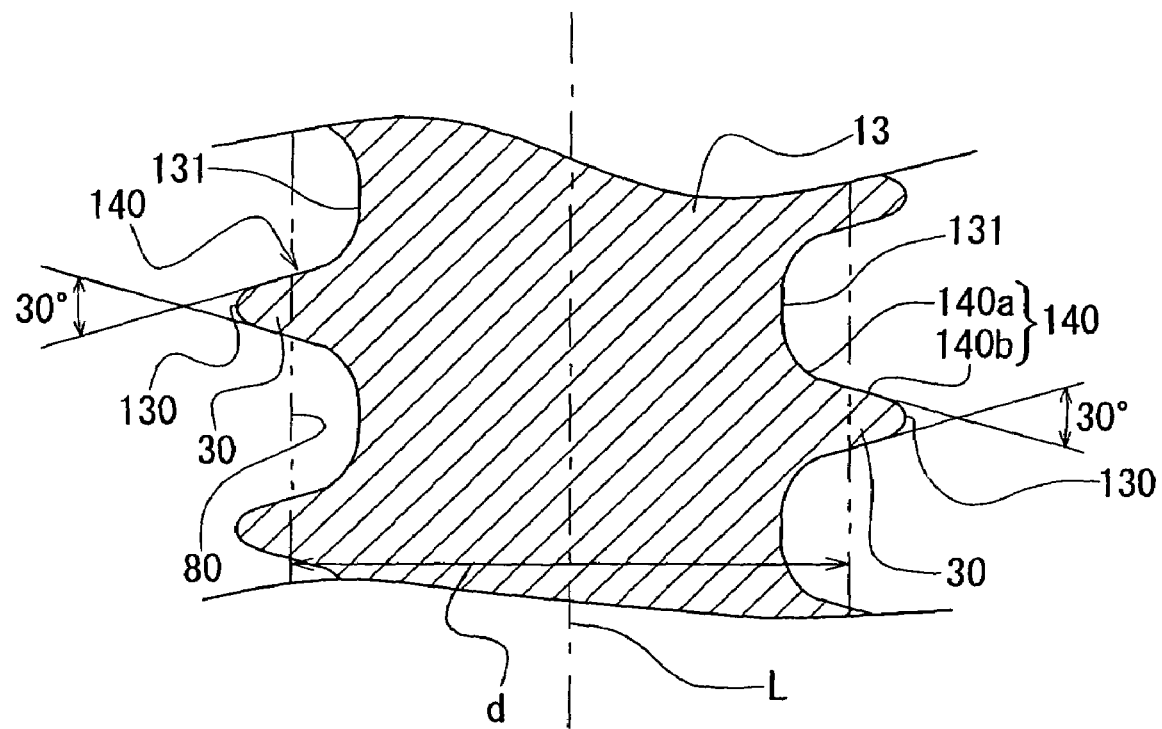
FIG. 3 is an enlarged cross sectional view of a thread portion in a cross section including a shaft center of the tapping screw in accordance with the present invention.

Next, a description will be given in detail of a shape of the thread portion 30 with reference to FIG. 3. In this case, FIG. 3 is a partially enlarged view of the thread portion 30 in a cross section including the shaft center L of the tapping screw 10. As shown in FIG. 3, the thread portion 30 of the tapping screw 10 is formed such that the angle of the thread ridge is 30 degrees, and the bottom portion 131 thereof is formed in a substantially linear shape and the top portion 130 thereof is formed in a circular arc shape, respectively. Further, the bottom portion 131 and the top portion 130 are connected by a joint portion 140. The joint portion 140 is provided with a bottom side joint portion 140a in a side of the bottom portion 131, and a top side joint portion 140b in a side of the top portion 130. The bottom side joint portion 140a is formed in a substantially circular arc shape, and the top side joint portion 140b is formed in a substantially linear shape. The bottom side joint portion 140a is formed in an area having a smaller diameter than a diameter d of a prepared hole 80 of a subject shown by a two-dot chain line in FIG. 3, and the top side joint portion 140b is formed between a part of the area having the smaller diameter than the prepared hole diameter d and an area having a larger diameter than the prepared hole diameter d. In this case, the joint portion 140 is formed in the circular arc shape in the bottom side of the thread portion 30 because an excess thickness in a peripheral surface of the prepared hole 80 smoothly flows into the bottom portion 131 of the thread portion 30 at a time of fastening the tapping screw 10 to the subject, and it is desirable to form the joint portion 140 so as to be always in a circular arc shape in the area having the smaller diameter than the prepared hole diameter d and be always in a linear shape in the area having the larger diameter than the prepared hole diameter d.

With reference to Tables 1 and 2, a description will be given of a difference in performance between the tapping screw 10 in accordance with the present invention (described above) and another tapping screw having a different structure, at a time of actually fastening both the tapping screws into the resin subject.

Figure 4:
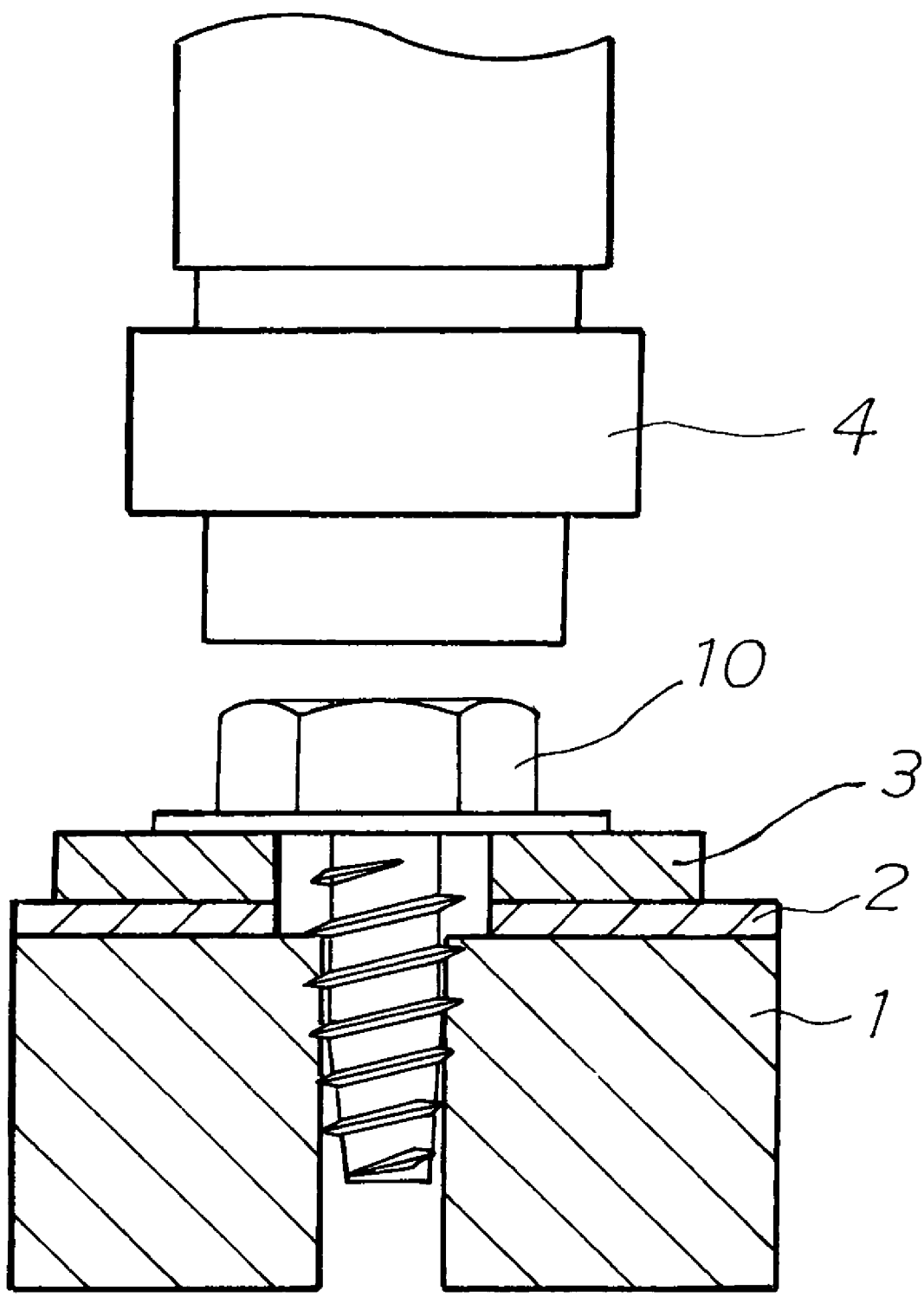

The measurement of a screwing torque and a strip torque are obtained using a micro torque testing machine (manufactured by MORI ENGINEERING CO., LTD., type T2-10K, Max 20 N·m) having a structure shown in FIG. 4. SPCC steel plate 3 is mounted on a subject 1 in which the prepared hole is pierced as illustrated, via a rubber layer 2, the tapping screw is fastened by the micro torque testing machine at a fastening speed of 10 rpm and by a thrust of 30 N, a torque curve at this time is recorded by a torque sensor 4, and a screwing torque and a strip torque are read from the results. In this case, at a time of actually fastening the tapping screw to the subject, the tapping screw is formed from an alloy steel having an outer diameter of 6 mm, and the subject is formed from a PBT resin containing a glass fiber and having the prepared hole diameter of 5.1 mm (in Table 1) and the prepared hole diameter of 5.3 mm (in Table 2). Further, such a torque that the female thread portion in the peripheral surface of the prepared hole of the subject is broken at a time of fastening the screw is set as the strip torque in Tables 1 and 2. Each of the tapping screws of the present invention are compared to tapping screws (i.e., other tapping screws in Tables 1 and 2) having the same structure as that of the tapping screw 10 except that the thread ridge and notch portions are of a different structure from that of the tapping screw 10 of the present invention.

TABLE 1

|  | Angle of thread ridge (degree) | Screwing torque (N · m) | Strip torque (N · m) |
| --- | --- | --- | --- |
| Tapping screw of present invention | 30 | 4.0 | 18.5 |
| Other tapping screw | 20 | 3.9 | 16.9 |
| Other tapping screw | 40 | 4.2 | 18.7 |

As shown in Table 1, comparing the tapping screw 10 with the other tapping screws, the screwing torque of the tapping screw 10 in accordance with the present invention is 4.0 N·m. To the contrary, the screwing torque in the tapping screw having the thread ridge angle of 20 degrees is 3.9 N·m, which is smaller. However, since the strip torque in the tapping screw having a 20 degree thread ridge angle is smaller (i.e., 16.9 N·m), the female thread portion in the peripheral surface of the prepared hole of the subject is easily broken at a time of fastening with a higher possibility than the tapping screw 10 in accordance with the present invention in which the torque is 18.5 N·m. Further, the strip torque is highest in the screw having the thread ridge angle of 40 degrees, however, the screwing torque in the screw becomes larger (i.e., 4.2 N·m). In other words, in the tapping screw 10 in accordance with the present embodiment in which the thread ridge angle is 30 degrees, it is possible to make the screwing torque small to a certain level, and it is possible to secure a high strip torque. Further, since the difference between the strip torque and the screwing torque is large, it is easy to obtain a seating feeling of the screw on the subject. For example, even in the case of fastening the tapping screw 10 into the subject at a position being hard to be visually observed, the tapping screw can be preferably employed.

TABLE 2

|  | Notch | Screwing torque (N · m) | Strip torque (N · m) |
|---|---|---|---|
| Tapping screw of present invention | Four pitch | 3.3 | 17.0 |
| Other tapping screw | All thread ridge | 3.1 | 14.7 |
| Other tapping screw | None | 4.1 | 17.7 |

Table 2 shows a comparison between the tapping screw 10 in accordance with the present invention in which the notches are formed only at four pitches in the leading end side of the shaft portion and a tapping screw in which the notches are formed over all of the thread ridge. Table 2 also shows a comparison between the four-pitch tapping screw of the present invention and the tapping screw in which no notch has been formed in the thread ridge. The screwing torque in the tapping screw 10 according to the present invention is 3.3 N·m. To the contrary, the screwing torque in the tapping screw in which the notches are formed over all of the thread ridge is 3.1 N·m, which is smaller. In this case, since the strip torque is smaller (i.e., 14.7 N·m), and the difference between the strip torque and the screwing torque is small, the seating feeling of the screw on the subject is hard to be obtained, and the possibility that the female thread portion in the peripheral surface of the prepared hole of the subject is broken at a time of fastening is higher as compared to the tapping screw 10 of the present invention having the strip torque of 17.0 N·m.

The strip torque is largest in the tapping screw in which no notch is provided in the thread ridge, however, the screwing torque is accordingly higher because of the lack of notches in the thread ridge. On the contrary, in the tapping screw 10 in accordance with the present invention, the strip torque is 17.0 N·m, which is approximately equal to the value of the tapping screw having no notches in the thread ridge. In other words, among the three tapping screws mentioned above, the tapping screw 10 in accordance with the present invention can make the difference between the strip torque and the screwing torque largest by making the screwing torque small and securing the strip torque high. Accordingly, the seating feeling of the screw on the subject can be easily obtained, and it is possible to increase an efficiency of the fastening work.

As described above, in the tapping screw 10 in accordance with the present embodiment, since the thread portion 30 is formed such that the thread ridge angle is 30 degrees, it is possible to reduce the screwing torque into the subject, and it is possible to reduce the radial component of the force applied to the female thread portion in the peripheral surface of the prepared hole from the thread portion, that is, the force for expanding the subject to an outer side in the radial direction. Accordingly, it is possible to prevent the subject from being expanded to the outer side in the radial direction and becoming cracked. Further, since the top portion 130 of the thread portion 30 is formed in the circular arc shape, it is possible to plastically deform the subject without overburden at a time of screwing the tapping screw into the subject.

Further, since the joint portion 140 for connecting the top portion 130 and the bottom portion 131 in the thread portion 30 is formed in the circular arc shape in the area having the smaller diameter than the prepared hole diameter d of the subject, it is possible to smoothly flow the excess thickness of the subject into the bottom portion 131 of the thread portion 30 at a time of screwing the tapping screw into the subject. Accordingly, it is possible to securely fasten the tapping screw 10 to the subject, and it is possible to increase the torque by which the female thread portion in the peripheral surface of the prepared hole is broken. Further, since it is possible to increase the difference between the screwing torque and the torque by which the female thread portion is broken, the seating feeling of the tapping screw 10 on the subject can be easily obtained. For example, in the case that the tapping screw 10 is fastened to the subject in the portion in which the tapping screw 10 is hard to be visually observed, it is possible to check out the seating of the screw on the subject only by the screwing feeling, and it is possible to securely carry out the fastening work.

Further, since the top portion 130 of the thread portion 30 is partly cut by the notches 50, it is possible to efficiently form the female screw in the peripheral surface of the prepared hole of the subject, and it is possible to lower the screwing torque of the tapping screw 10 to the subject. Further, since the forming range of the notches 50 is restricted to be equal to or less than a half of the entire length of the shaft portion 13, in particular, approximately at four pitches, it is possible to secure the contact area between the thread portion 30 of the tapping screw 10 and the subject so as to securely fasten both the members. Accordingly, the female thread portion in the peripheral surface of the prepared hole is not easily broken.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed:

1. A tapping screw, comprising:
    a head portion;
    a shaft portion extending from said head portion; and
    a thread portion formed on an outer surface of said shaft portion, said thread portion including top and bottom portions connected to one another by a joint portion comprising a top side joint portion adjacent said top portion and a bottom side joint portion adjacent said bottom portion, and a plurality of notches being formed in said top portion of said thread portion extending a predetermined distance from said top portion toward said bottom portion of said thread portion and over a predetermined range along the axial length of said shaft portion, wherein
    said top side joint portion defines a thread ridge having an angle of approximately 25–35° symmetrical about an imaginary line extending perpendicularly from a center axis of said shaft portion, and said bottom side joint portion has a circular arc shape in an area having a smaller diameter as compared to a diameter of a prepared hole in a member into which said thread portion is inserted and fastened, when viewed in a cross section taken along the axis of said tapping screw, a thread pitch is one revolution of said thread portion around said shaft portion, and four of said notches are formed on each thread pitch, said notches are spaced approximately 90° apart about the axis of said tapping screw, and said notches are formed on less than all of the thread pitches of said shaft portion.

2. A tapping screw as claimed in claim 1, wherein said joint portion has a portion that is formed in a linear shape in an area having a larger diameter as compared to the diameter of said prepared hole, when viewed in said cross section along the axis of said tapping screw.

3. A tapping screw as claimed in claim 2, wherein said top portion is formed in a circular arc shape, when viewed in said cross section along the axis of said tapping screw.

4. A tapping screw as claimed in claim 1, wherein said angle of said thread ridge is approximately 30°.

5. A tapping screw as claimed in claim 1, wherein said angle of said tread ridge is approximately 27–33°.

* * * * *